US012001236B2

(12) United States Patent
Katoh et al.

(10) Patent No.: US 12,001,236 B2
(45) Date of Patent: Jun. 4, 2024

(54) WORK VEHICLE AND METHOD FOR CONTROLLING WORK VEHICLE

(71) Applicant: KOMATSU LTD., Tokyo (JP)

(72) Inventors: Masashi Katoh, Tokyo (JP); Yuuki Kobayashi, Tokyo (JP); Keisuke Kubota, Tokyo (JP)

(73) Assignee: KOMATSU LTD., Tokyo (JP)

( * ) Notice: Subject to any disclaimer, the term of this patent is extended or adjusted under 35 U.S.C. 154(b) by 326 days.

(21) Appl. No.: 17/639,092

(22) PCT Filed: Sep. 9, 2020

(86) PCT No.: PCT/JP2020/034139

§ 371 (c)(1),
(2) Date: Feb. 28, 2022

(87) PCT Pub. No.: WO2021/049535

PCT Pub. Date: Mar. 18, 2021

(65) Prior Publication Data

US 2022/0300025 A1 Sep. 22, 2022

(30) Foreign Application Priority Data

Sep. 12, 2019 (JP) ................................ 2019-166475

(51) Int. Cl.
*G05G 5/02* (2006.01)
*E02F 9/20* (2006.01)

(52) U.S. Cl.
CPC ............. *G05G 5/02* (2013.01); *E02F 9/2004* (2013.01); *G05G 2505/00* (2013.01)

(58) Field of Classification Search
CPC .. G05G 5/02; G05G 9/047; G05G 1/52; E02F 9/20; E02F 9/2004; E02F 9/92246
(Continued)

(56) References Cited

U.S. PATENT DOCUMENTS 6,929,085 B2 * 8/2005 Sugitani ................. B62D 6/007
180/444
8,126,618 B2 * 2/2012 Yamada ................ B66F 17/003
701/50
(Continued)

FOREIGN PATENT DOCUMENTS

CN 1181140 A 5/1998
EP 0 821 299 A1 1/1998
(Continued)

OTHER PUBLICATIONS

The Office Action for the corresponding Chinese application No. 202080057039.0, issued on Sep. 28, 2022.
(Continued)

*Primary Examiner* — Andrew Joseph Rudy
(74) *Attorney, Agent, or Firm* — Global IP Counselors, LLP

(57) ABSTRACT

A work vehicle includes a vehicle main body, a work implement attached to the vehicle main body, an operating lever configured to operate the work implement, an imparting section configured to impart force to the operating lever, an acceleration detection section configured to detect acceleration of the vehicle main body, and a control section configured to control the imparting section to automatically adjust a magnitude of the force imparted to the operating lever based on the acceleration detected by the acceleration detection section.

10 Claims, 11 Drawing Sheets

(58) Field of Classification Search
USPC .............................................................. 701/50
See application file for complete search history.

(56) References Cited

U.S. PATENT DOCUMENTS

| | | | | |
|---|---|---|---|---|
| 11,149,404 | B2 * | 10/2021 | Suzuki .................. | E02F 9/2004 |
| 2022/0106773 | A1 * | 4/2022 | Iwasaki .................. | E02F 9/265 |

FOREIGN PATENT DOCUMENTS

| | | | |
|---|---|---|---|
| JP | 8-319631 | A | 12/1996 |
| JP | 11-293706 | A | 10/1999 |
| JP | 2001-302199 | A | 10/2001 |
| JP | 2003-202926 | A | 7/2003 |
| JP | 2003-300425 | A | 10/2003 |
| JP | 2009-161275 | A | 7/2009 |
| JP | 2010-66962 | A | 3/2010 |
| JP | 2010-248867 | A | 11/2010 |
| JP | 2016-161954 | A | 9/2016 |
| WO | 96/32670 | A1 | 10/1996 |

OTHER PUBLICATIONS

The International Search Report for the corresponding international application No. PCT/JP2020/034139, issued on Nov. 2, 2020.
The Office Action for the corresponding Korean application No. 10-2022-7002846, issued on Jun. 30, 2023.

* cited by examiner

WORK VEHICLE AND METHOD FOR CONTROLLING WORK VEHICLE

CROSS-REFERENCE TO RELATED APPLICATIONS

This application is a U.S. National stage application of International Application No. PCT/JP2020/034139, filed on Sep. 9, 2020. This U.S. National stage application claims priority under 35 U.S.C. § 119(a) to Japanese Patent Application No. 2019-166475, filed in Japan on Sep. 12, 2019, the entire contents of which are hereby incorporated herein by reference.

BACKGROUND

Field of the Invention

The present invention relates to a work vehicle and a method for controlling a work vehicle.

Background Information

A hydraulic excavator, which is an example of a work vehicle, performs work such as excavation, but includes the following problems.

When a bucket is caught on an object to be excavated during heavy excavation or excavation of rocks or tree roots, the vehicle main body may receive strong impact and vibration due to hunting. Along with this, the operator in the cab was also shaken by strong impact and vibration, and the operating lever for operating the work implement was unintentionally operated, and the work implement was sometimes erroneously operated.

Further, the hydraulic excavator does not include a suspension on the lower traveling unit to absorb the vibration from the road surface. For this reason, when traveling on hard and uneven ground such as rocky ground, movements such as pitching occur in the work vehicle. At this time, the knob of the operating lever for the work implement vibrates by the inertial force due to the vibration of the vehicle main body, and the work implement may operate even though the operator does not operate the operating lever.

In order to solve such a problem, for example, Japanese Patent Laid-Open Patent Application 2010-248867 discloses that, by increasing the neutral insensitivity of the operating lever for the work implement, even when the operating lever for the work implement vibrates, the output signal from the operating lever is limited so that the work implement is not operated.

SUMMARY

However, in the above-mentioned conventional control, when the operator is shaken due to the vibration or impact of the vehicle main body and an erroneous operation such as hooking the operating lever with an elbow or the like is performed, the work implement is operated.

An object of the present invention is to provide a work vehicle and a method for controlling a work vehicle capable of suppressing erroneous operation due to vibration, impact, or the like.

The work vehicle of the present disclosure includes a vehicle main body, a work implement, an operating lever, an imparting section, an acceleration detection section, and a control section. The work implement is attached to the vehicle main body. The imparting section imparts force to the operating lever. The acceleration detection section detects acceleration of the vehicle main body. The control section controls the imparting section to automatically adjust magnitude of the force imparted to the operating lever based on the acceleration detected by the acceleration detection section.

The method for controlling a work vehicle of the present disclosure includes a reception step, an adjustment step, and a transmission step. The reception step receives acceleration of the vehicle main body. The adjustment step automatically adjusts magnitude of force imparted to an operating lever that operates a work implement attached to the vehicle main body based on the received acceleration. The transmission step transmits a command to an imparting section imparting the force to the operating lever so that the magnitude of the adjusted force is imparted to the operating lever.

According to the present disclosure, it is possible to provide a work vehicle and a method for controlling a work vehicle capable of suppressing erroneous operation due to vibration, impact, or the like.

DETAILED DESCRIPTION OF EMBODIMENT(S)

Hereinafter, the hydraulic excavator 1 (an example of a work vehicle) of the embodiment according to the present invention will be described with reference to the drawings.

Embodiment 1

(Configuration)

(Overview of the Configuration of the Hydraulic Excavator 1)

Figure 1:
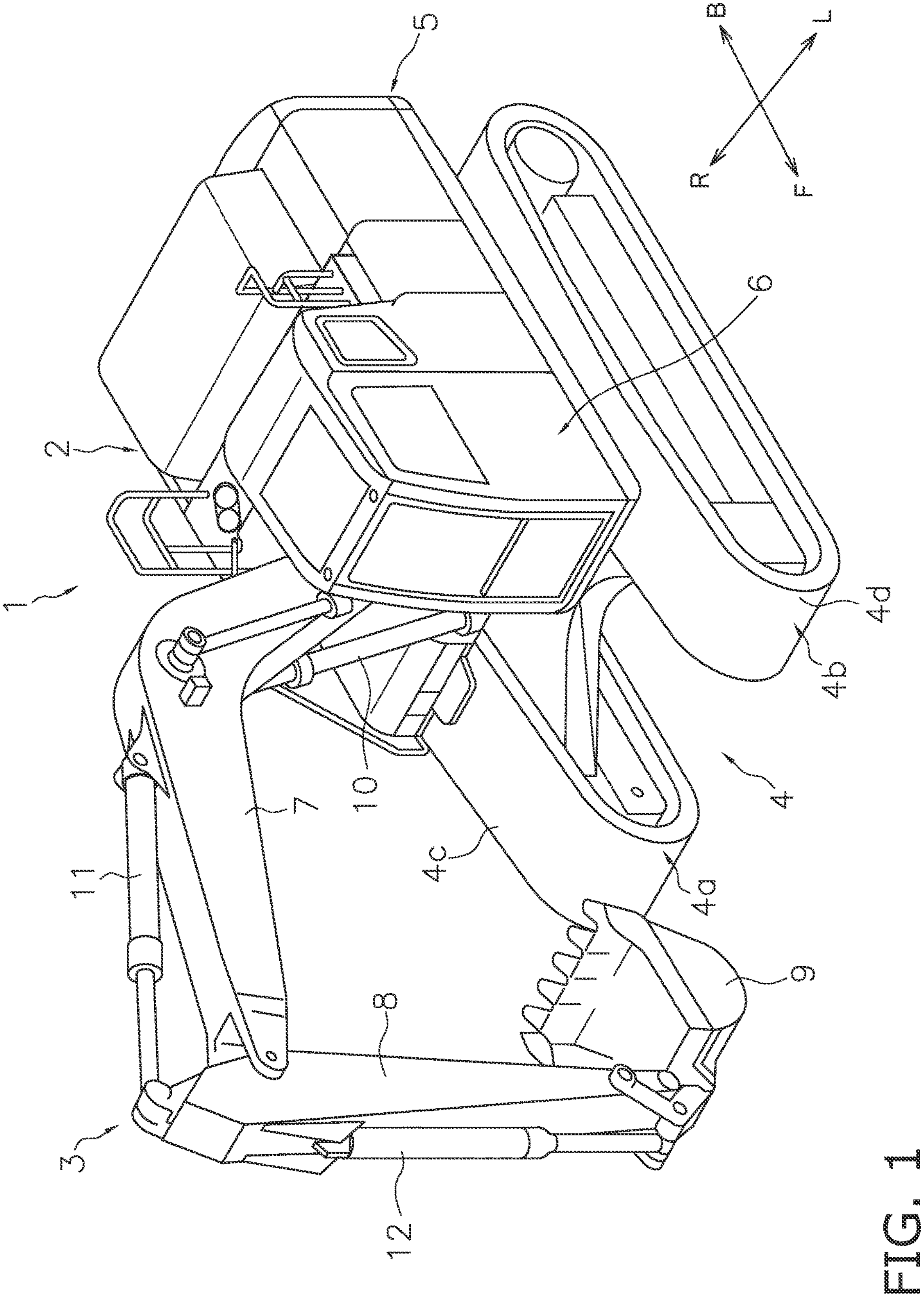
FIG. 1 is a perspective view of a hydraulic excavator according to the first embodiment of the present disclosure.

FIG. 1 is a schematic view showing the configuration of the hydraulic excavator 1 of the present embodiment.

The hydraulic excavator 1 includes a vehicle main body 2 and a work implement 3. As shown in FIG. 1, the vehicle main body 2 includes a traveling unit 4 and a revolving unit 5. The traveling unit 4 includes a pair of traveling devices 4*a* and 4*b*. Each of the traveling devices 4*a* and 4*b* includes tracks 4*c* and 4*d*, and the hydraulic excavator 1 travels by driving the tracks 4*c* and 4*d* with the driving force from the engine.

The revolving unit 5 is arranged on the traveling unit 4. The revolving unit 5 is provided so as to be revolvable with respect to the traveling unit 4 about an axis along the vertical direction by a revolving device (not shown).

A cab 6 as a driver's room is provided at a position on the left side of the front part of the revolving unit 5. The revolving unit 5 accommodates a hydraulic pump, an engine (not shown) and the like. Unless otherwise specified in the present embodiment, the front, back, left and right will be described with reference to the driver's seat in the cab 6. The direction in which the driver's seat faces the front is the front direction F, and the direction facing the front direction is the back direction B. The right side and the left side in the lateral direction when the driver's seat faces the front are the right direction R and the left direction L, respectively.

The work implement 3 includes a boom 7, an arm 8, and an excavation bucket 9, and is attached to the front center position of the revolving unit 5. Specifically, the work implement 3 is located on the right side of the cab 6. The base end portion of the boom 7 is rotatably connected to the revolving unit 5. Further, the tip end portion of the boom 7 is rotatably connected to the base end portion of the arm 8. The tip of the arm 8 is rotatably connected to the excavation bucket 9. The excavation bucket 9 is attached to the arm 8 so that its opening can face the direction (backward) of the vehicle main body 2. A hydraulic excavator in which the excavation bucket 9 is attached in such a direction is called a backhoe. Further, hydraulic cylinders 10 to 12 (a boom cylinder 10, an arm cylinder 11 and a bucket cylinder 12) are arranged so as to correspond to the boom 7, the arm 8 and the excavation bucket 9, respectively. The work implement 3 is driven by driving these hydraulic cylinders 10 to 12. As a result, work such as excavation is performed.

Figure 6:
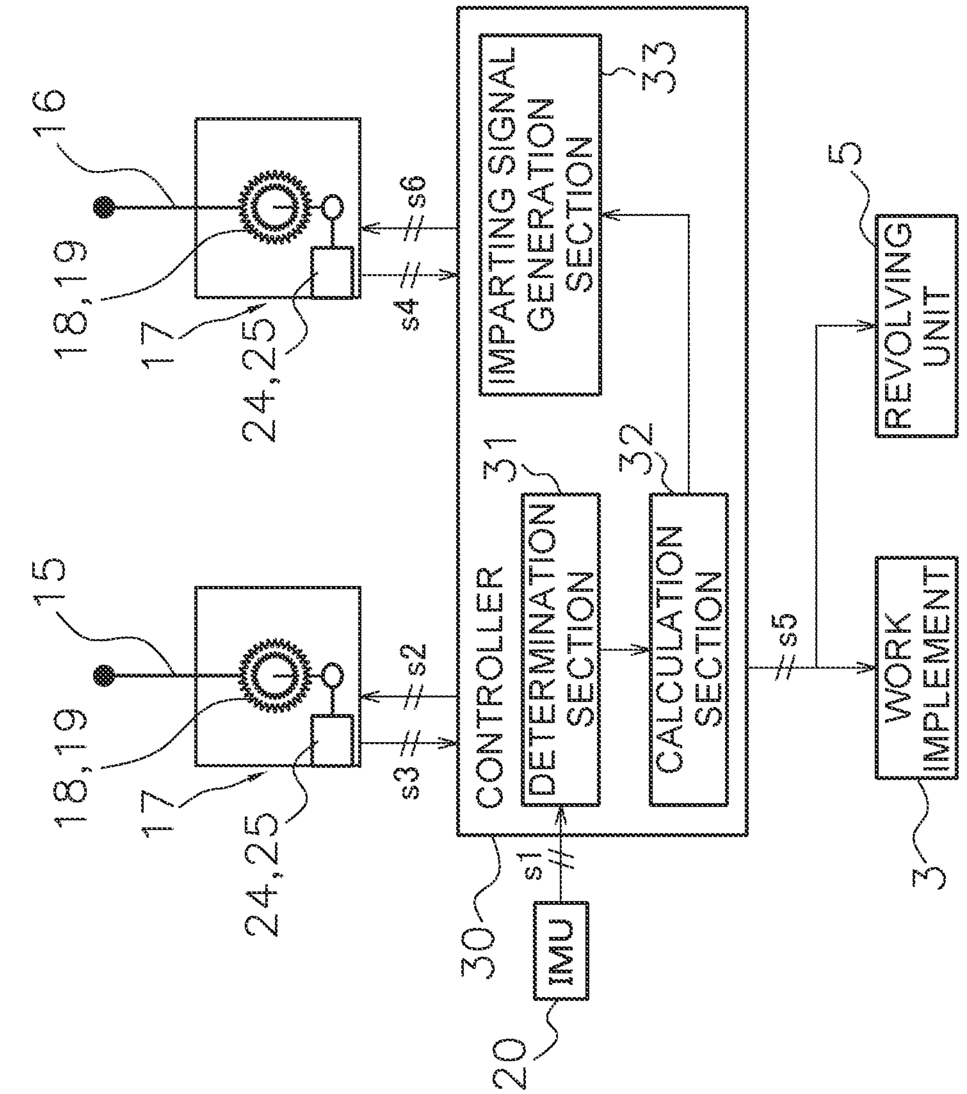
FIG. 6 is a block diagram showing a configuration of a control section of the hydraulic excavator on FIG. 1.

Further, as shown in FIG. 6, which will be described later, the vehicle main body 2 is provided with an IMU (Inertial Measurement Unit) 20 and a control section 30. The IMU 20 detects the acceleration generated in the vehicle main body 2. The IMU 20 generally includes a three-axis gyro and a three-direction accelerometer, and can detect three-dimensional angular velocity and acceleration. The IMU 20 is provided on the revolving unit 5. The installation location of the IMU 20 in the revolving unit 5 may be on the engine hood, the cab ceiling, the inside of the housing of the operating lever, or the like, and is not particularly limited. The control section 30 controls the work implement 3, the revolving unit 5, and the imparting section 17, which will be described later. The IMU 20 and the control section 30 will be described later.

(Cab 6)

Figure 2:
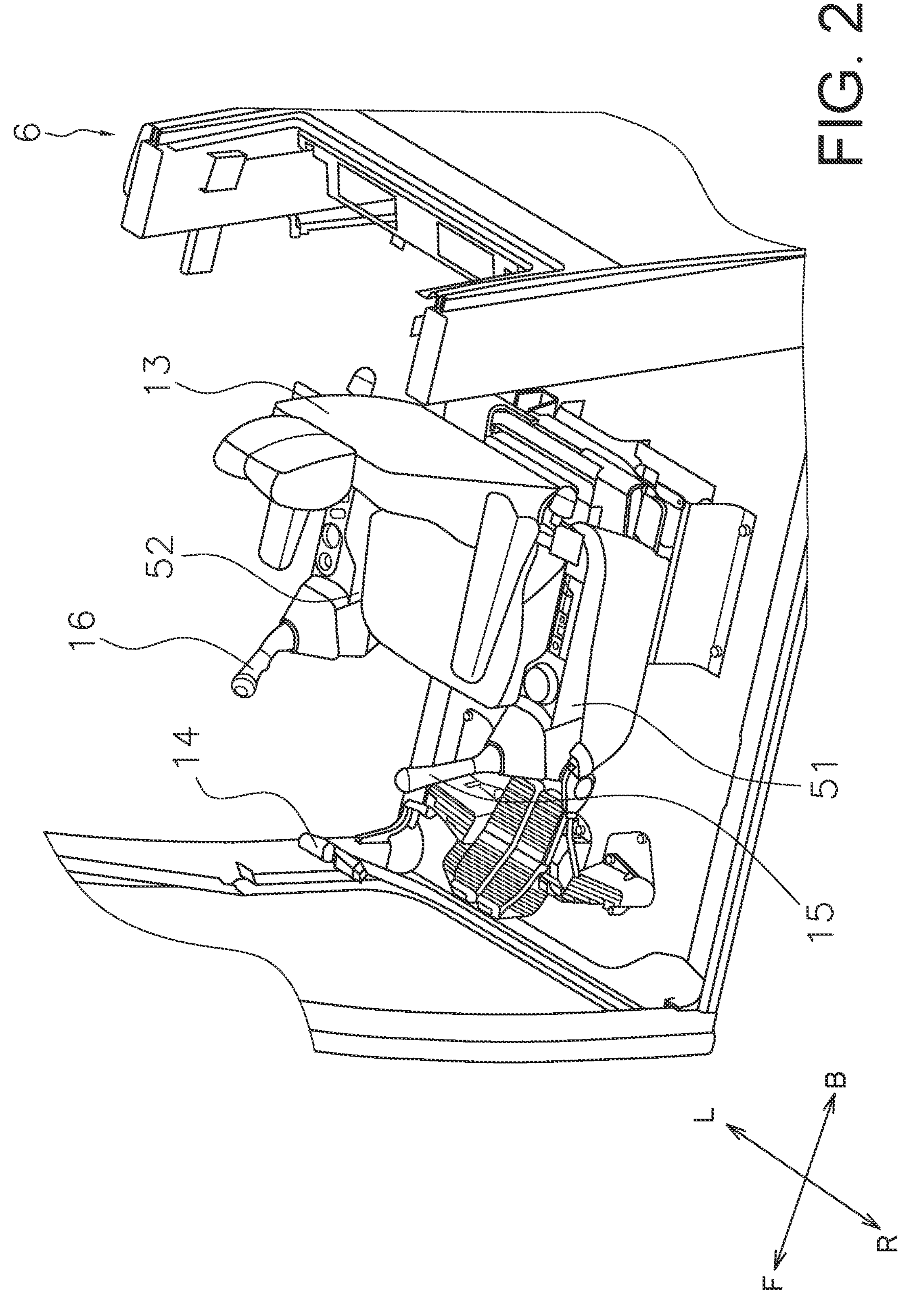
FIG. 2 is a perspective view showing the inside of a cab of the hydraulic excavator on FIG. 1.

FIG. 2 is a perspective view showing the inside of the cab 6.

A driver's seat 13, a traveling lever 14, a left work implement operating lever 15, and a right work implement operating lever 16 are provided in the cab 6.

The traveling lever 14 is arranged on the front side of the driver's seat 13. By pushing the traveling lever 14 forward, the vehicle main body 2 travels forward, and by pulling the traveling lever 14 toward an operator, the vehicle main body 2 travels backward.

The left work implement operating lever 15 is provided on the console box 51 arranged on the left side of the driver's seat 13. The left work implement operating lever 15 can be tilted in four directions, front, back, left and right.

The arm 8 is pushed out by tilting the left work implement operating lever 15 forward, and the arm 8 is pulled in by tilting the left work implement operating lever 15 backward. Further, the revolving unit 5 revolves to the right by tilting the left work implement operating lever 15 toward the driver's seat 13, and the revolving unit 5 revolves to the left by tilting the left work implement operating lever 15 to the opposite side of the driver's seat 13. In the state where the left work implement operating lever 15 is arranged in the neutral position in the front, back, left and right, the revolving unit 5 and the arm 8 are held at that position while being stopped.

The right work implement operating lever 16 is provided on the console box 52 arranged on the right side of the driver's seat 13. The right work implement operating lever 16 can be tilted in four directions, front, back, left and right.

The boom 7 is lowered by tilting the right work implement operating lever 16 forward, and the boom 7 is raised by tilting the right work implement operating lever 16 backward. The excavation bucket 9 dumps by tilting the right work implement operating lever 16 to the opposite side of the driver's seat 13, and the excavation bucket 9 operates excavation by tilting the right work implement operating lever 16 to the driver's seat 13 side. In the state where the right work implement operating lever 16 is arranged in the neutral position in the front, back, left and right, the boom 7 and the excavation bucket 9 do not move and are held at that position.

Further, in the cab 6, an imparting section 17 and a first potentiometer 18 and a second potentiometer 19 are provided for each of the left work implement operating lever 15 and the right work implement operating lever 16.

(Imparting Section 17)

Since the imparting section 17 provided for each of the left work implement operating lever 15 and the right work implement operating lever 16 includes the same configuration, the left work implement operating lever 15 side will be described as an example.

Figure 3:
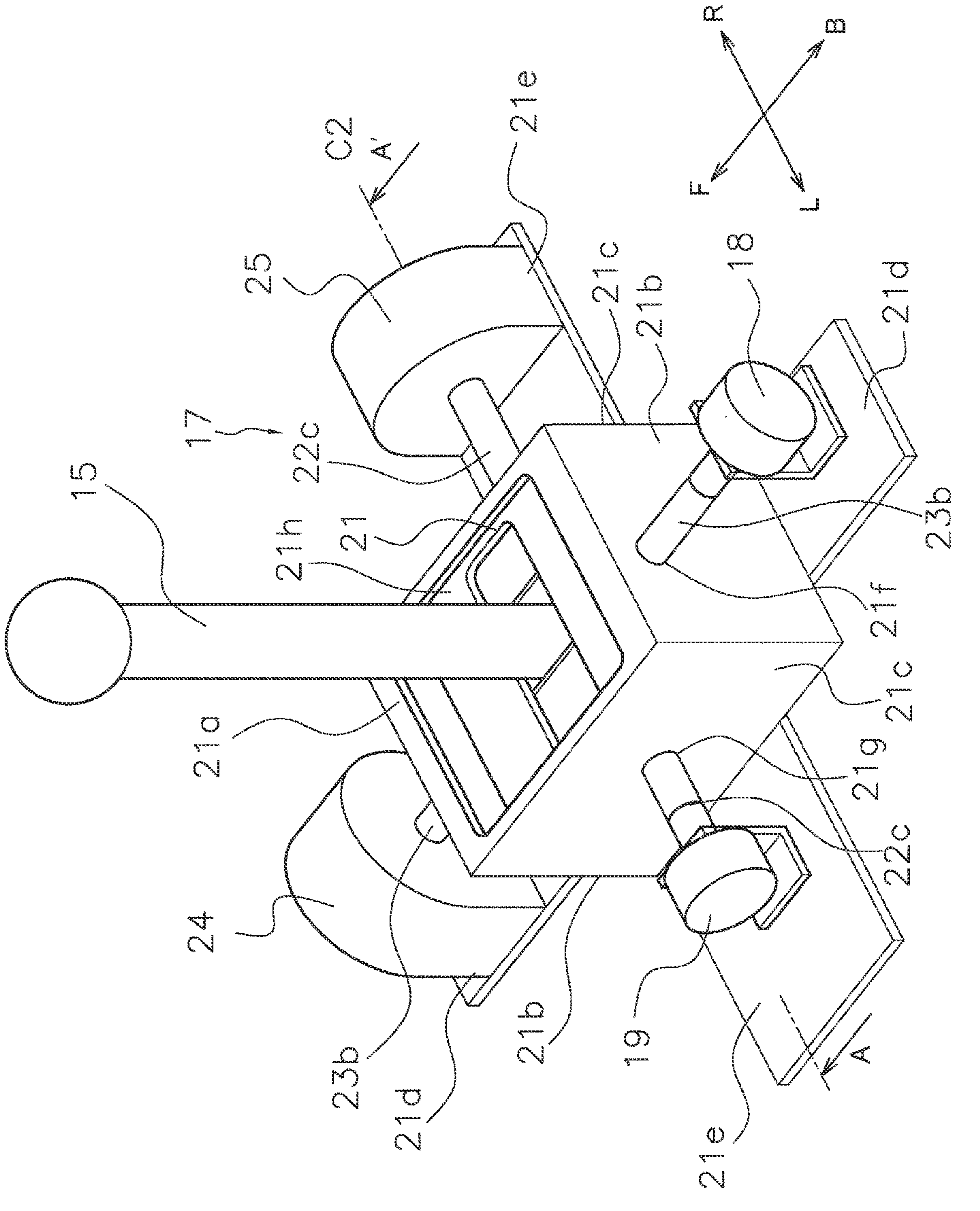
FIG. 3 is a perspective view schematically showing an external configuration of an imparting section provided in the cab on FIG. 2.
Figure 4:
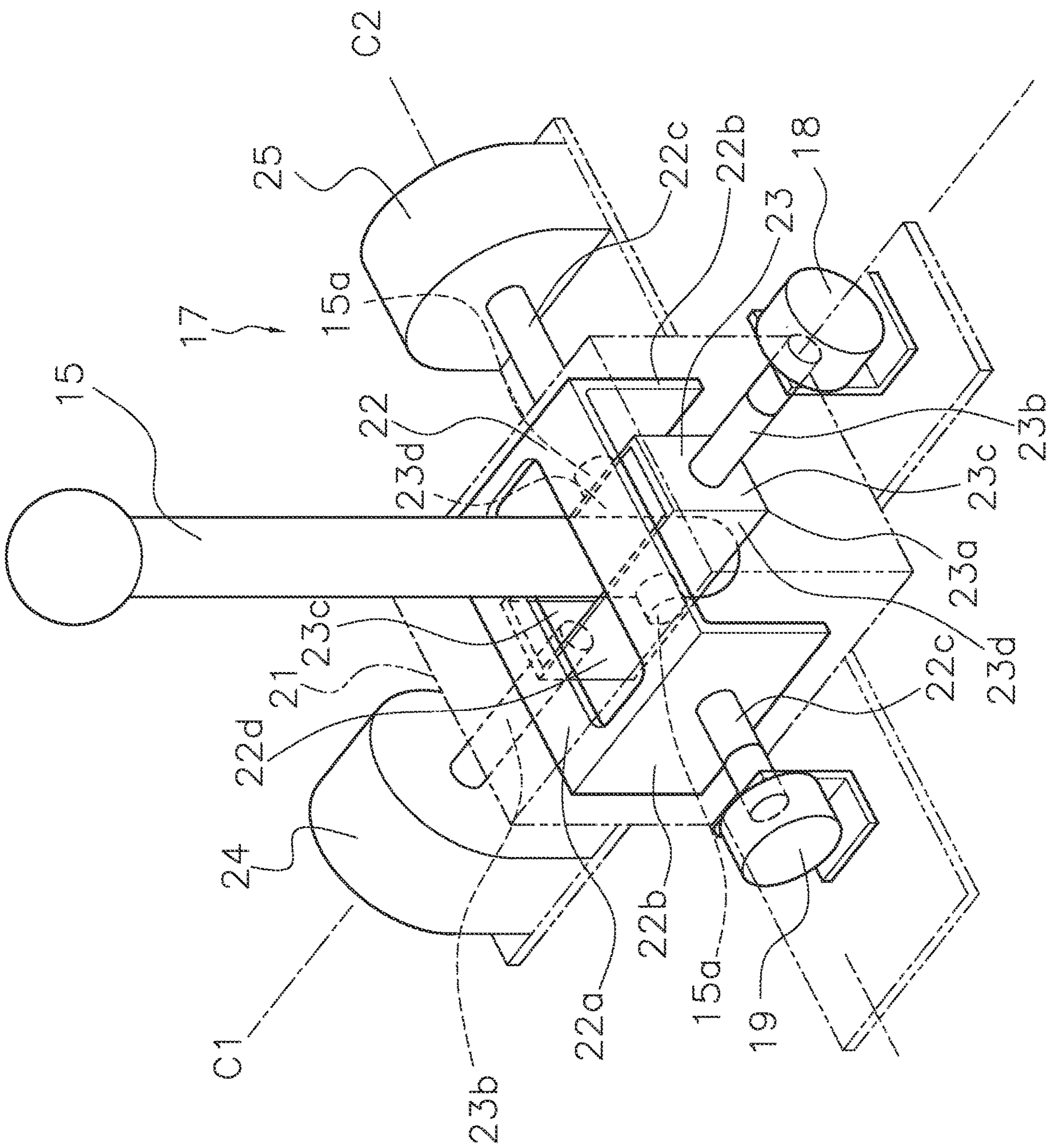
FIG. 4 is a perspective view schematically showing the internal configuration of the imparting section on FIG. 3.
Figure 5:
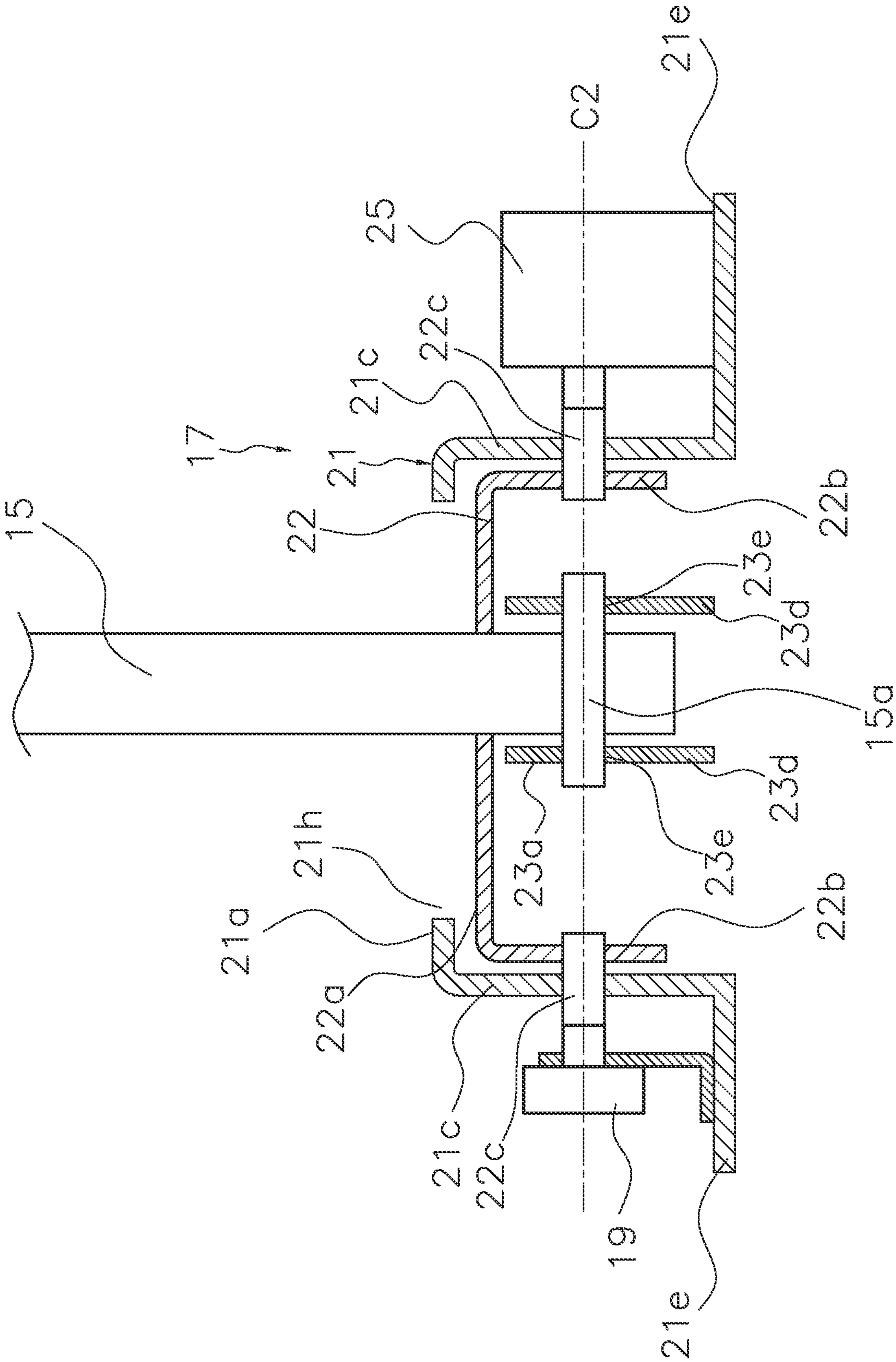
FIG. 5 is a cross-sectional view from the arrow direction of the AA' line in FIG. 3.

FIG. 3 is a perspective view schematically showing the appearance configuration of the imparting section 17. FIG. 4 is a perspective view schematically showing the internal configuration of the imparting section 17. FIG. 5 is a cross-sectional view from the arrow direction of the AA' line in FIG. 3.

As shown in FIG. 4, the imparting section 17 includes a first support frame 21, a second support frame 22, a third support frame 23, a first motor 24, and a second motor 25.

(First Support Frame 21)

The first support frame 21 is fixed to the frame of the console box 51, and supports the left work implement operating lever 15 so as to be tiltable back and forth and left and right via the second support frame 22 and the third support frame 23.

For example, as shown in FIG. 3, the first support frame 21 includes a box shape, and includes an upper surface 21*a*, a pair of side surfaces 21*b*, a pair of side surfaces 21*c*, a pair of arrangement surfaces 21*d*, and a pair of arrangement surfaces. 21*e*.

A square shape through hole 21*h* is formed on the upper surface 21*a* in a plan view.

The pair of side surfaces 21*b* are provided so as to face downward from each of the front end and the back end of the upper surface 21*a*. The pair of side surfaces 21*b* are arranged so as to face each other in the front-back direction. Through holes 21*f* are formed in each of the pair of side surfaces 21*b*.

The pair of side surfaces 21*c* are provided so as to face downward from each of the left end and the right end of the upper surface 21*a*. The pair of side surfaces 21*c* are arranged so as to face each other in the left-right direction. Through holes 21*g* are formed in each of the pair of side surfaces 21*c*.

A box shape is formed by an upper surface 21*a*, a pair of side surfaces 21*b*, and a pair of side surfaces 21*c*.

The pair of arrangement surfaces 21*d* are provided so as to be perpendicular to the side surface 21*b* and extend outward from the lower ends of each of the pair of side surfaces 21*b*.

The pair of arrangement surfaces 21*e* are provided so as to be perpendicular to the side surfaces 21*c* and extend outward from the lower ends of each of the pair of side surfaces 21*c*.

(Second Support Frame 22)

In FIG. 4, the first support frame 21 is shown by a two-dot chain line, and the inside configuration of the first support frame 21 is shown by a solid line.

The second support frame 22 is rotatably arranged inside the first support frame 21 with respect to the first support frame 21. As shown in FIG. 5, the second support frame 22 is formed in an inverted U shape when viewed along the front-back direction.

The second support frame 22 includes an upper surface 22*a*, a pair of side surfaces 22*b*, and a shaft 22*c*. The pair of side surfaces 22*b* are provided so as to face downward from the left and right ends of the upper surface 22*a*. The upper surface 22*a* is provided with a through hole 22*d* formed along the left-right direction. Further, the width of the through hole 22*d* in the front-back direction is set to be substantially the same as the diameter of the left work implement operating lever 15. The left work implement operating lever 15 tilts in the left-right direction along the through hole 22*d*.

The shaft 22*c* is provided on each of the pair of side surfaces 22*b* along the left-right direction so as to project outward. The shaft 22*c* on the left side surface 22*b* is provided from the left side surface 22*b* toward the left, and the shaft 22*c* on the right side surface 22*b* is provided from the right side surface 22*b* toward the right. The pair of shafts 22*c* are rotatably inserted into the through holes 21*g* formed in each of the pair of side surfaces 21*c*.

(Third Support Frame 23)

The third support frame 23 is rotatably arranged inside the first support frame 21 with respect to the first support frame 21. The third support frame 23 is arranged inside the second support frame 22.

As shown in FIG. 4, the third support frame 23 includes a frame part 23*a* and a shaft 23*b*. The frame part 23*a* includes a rectangular shape formed long in the front-back direction in a plan view. The frame part 23*a* surrounds the left work implement operating lever 15 in a plan view. The left work implement operating lever 15 is tilted along the front-back direction of the frame part 23*a*. The frame part 23*a* includes a pair of side surfaces 23*c* and a pair of side surfaces 23*d*. The pair of side surfaces 23*c* are arranged so as to face each other in the front-back direction. The pair of side surfaces 23*d* are arranged so as to face each other in the left-right direction. The side surface 23*d* is formed longer than the side surface 23*c* in a plan view. Through holes 23*e* are formed in each of the pair of side surfaces 23*d* as shown in FIG. 5.

The shaft 23*b* is provided on each of the pair of side surfaces 23*c* along the front-back direction so as to project outward. The shaft 23*b* provided on the front side surface 23*c* is arranged from the front side surface 23*c* toward the front, and the shaft 23*b* provided on the back side surface 23*c* is arranged from the back side surface 23*c* toward the back. The pair of shafts 23*b* are rotatably inserted into through holes 21*f* (see FIG. 3) formed in each of the pair of side surfaces 21*b*.

As shown in FIG. 5, the left work implement operating lever 15 includes a shaft 15*a* protruding in each of the left and right directions at its root portion. The shaft 15*a* is rotatably inserted into each through holes 23*e* of the pair of side surfaces 23*d*. The shaft 15*a* and the pair of shafts 22*c* of the second support frame 22 described above are coaxially arranged (see axis C2). The pair of shafts 23*b* of the third support frame 23 are arranged coaxially (see axis C1).

As a result, for example, when the left work implement operating lever 15 is tilted in the front-back direction, the left work implement operating lever 15 rotates about the shaft 15*a* with respect to the third support frame 23. At this time, since the frame part 23*a* of the third support frame 23 is formed long in the front-back direction, the left work implement operating lever 15 can be tilted in the front-back direction without interfering with the frame part 23*a*.

On the other hand, since the left work implement operating lever 15 comes into contact with the edge of the through hole 22*d*, the second support frame 22 rotates about the shaft 22*c* as the left work implement operating lever 15 rotates in the front-back direction. Since the shaft 15*a* and the pair of shafts 22*c* of the second support frame 22 described above are arranged on the coaxial C2, the left work implement operating lever 15 is tilted in the front-back direction about the axis C2.

Further, when the left work implement operating lever 15 is tilted in the left-right direction, the left work implement operating lever 15 rotates about the shaft 23*b* together with the third support frame 23. When the left work implement operating lever 15 is tilted in the left-right direction, the left work implement operating lever 15 moves along the through hole 22*d* of the second support frame 22, so that the left work implement operating lever 15 can be tilted in the left-right direction without interfering with the upper surface 22*a* of the second support frame 22. Since the pair of shafts 23*b* of the third support frame 23 are arranged on the coaxial C1, the left work implement operating lever 15 is tilted in the left-right direction about the axis C1.

(First Motor 24)

The first motor 24 is an electric motor and is connected to one of the pair of shafts 23*b* of the third support frame 23. The first motor 24 is fixed to the arrangement surface 21*d*.

The first motor 24 can impart force to the left work implement operating lever 15 so as to tilt in the left-right direction by imparting force to the shaft 23*b*.

In normal operation, using the first motor 24, reaction force can be imparted to the left work implement operating lever 15 and the right work implement operating lever 16 with respect to the operator's operation in order to make the operator feel the operation feeling of the lever. For example, when the operator tilts the left work implement operating lever 15 to the left, the operator can be given the operation feeling by imparting force to the shaft 23*b* so that the left work implement operating lever 15 tilts to the right. The normal operation, which will be described later, means a case where the absolute value of the acceleration detected by the IMU 20 is less than a predetermined threshold value.

Further, for example, when the left work implement operating lever 15 is tilted to the left while the absolute value of acceleration is equal to or more than the predetermined threshold value due to vibration or impact, the movement of the left work implement operating lever 15 can be restricted by imparting force to the shaft 23*b* with the first motor 24 so that the left work implement operating lever 15 is tilted to the right.

(Second Motor 25)

The second motor 25 is an electric motor and is connected to one of the pair of shafts 22*c* of the second support frame 22. The second motor 25 is fixed to the arrangement surface 21*e*.

The second motor 25 can impart force to the left work implement operating lever 15 so as to tilt in the front-back direction by imparting force to the shaft 22*c*. When the second motor 25 is rotated, the second support frame 22 rotates in the front-back direction, the edge of the through hole 22*d* abuts on the left work implement operating lever 15, so that the left work implement operating lever 15 also tilts in the front-back direction.

In normal operation, using the second motor 25, reaction force can be imparted to the left work implement operating lever 15 and the right work implement operating lever 16 with respect to the operator's operation in order to make the operator feel the operation feeling of the lever. For example, when the operator tilts the left work implement operating lever 15 in the forward direction, the operator can be given the operation feeling by imparting force to the shaft 22*c* so that the left work implement operating lever 15 tilts in the backward direction.

Further, for example, when the absolute value of acceleration exceeds the predetermined threshold vale due to vibration or impact and the left work implement operating lever 15 is tilted forward, the movement of the left work implement operating lever 15 can be restricted by imparting force to the shaft 22*c* with the two motors 25 so that the left work implement operating lever 15 is tilted to the back.

(First Potentiometer 18)

The first potentiometer 18 is connected to the other shaft 23*b* of the pair of shafts 23*b* of the third support frame 23. The first potentiometer 18 is fixed to the arrangement surface 21*d*.

The first potentiometer 18 detects the tilted position of the left work implement operating lever 15 in the left-right direction by detecting the rotational position of the shaft 23*b*. A command signal is transmitted based on this tilted position, and the revolving unit 5 revolves.

(Second Potentiometer 19)

The second potentiometer 19 is connected to the other shaft 22*c* of the pair of shafts 22*c* of the second support frame 22. The second potentiometer 19 is fixed to the arrangement surface 21*e*.

The second potentiometer 19 detects the tilted position of the left work implement operating lever 15 in the front-back direction by detecting the rotational position of the shaft 22*c*. A command signal is transmitted based on this tilted position, and the arm 8 is pushed out or pulled in.

(Control Section 30)

FIG. 6 is a block diagram showing the configuration of the control section 30. In FIG. 6, the first potentiometer 18 and the second potentiometer 19 are shown together. The first motor 24 and the second motor 25 are shown together.

The control section 30 includes a processor such as a CPU (Central Processing Unit) and a memory. The control section 30 expands the stored program on the memory and executes the program by the processor.

The control section 30 controls the imparting section 17 based on the value of the acceleration detected by the IMU 20. Further, the control section 30 controls the work implement 3 and the revolving unit 5 based on the positions of the left work implement operating lever 15 and the right work implement operating lever 16 by the first potentiometer 18 and the second potentiometer 19.

The control section 30 includes a determination section 31, a calculation section 32, and an imparting signal generation section 33. These the determination section 31, the calculation section 32, and the imparting signal generation section 33 are functions executed by the processor. The number of processors may be one or a plurality.

The IMU 20 and the control section 30 are electrically connected wirelessly or by wire, and a signal s1 including acceleration information detected from the IMU 20 is transmitted to the control section 30.

When the determination section receives the signal s1 including the acceleration information detected by the IMU 20, the determination section 31 determines whether the magnitude of the acceleration detected by the IMU 20 is equal to or more than the predetermined threshold value. For example, in the present embodiment, the determination section 31 determines whether the absolute value of the acceleration in the front-back direction is equal to or more than the predetermined threshold value or the absolute value of the acceleration in the left-right direction is equal to or more than the predetermined threshold value. The threshold value for the acceleration in the front-back direction and the threshold value for the acceleration in the left-right direction may be the same or different. Further, the magnitude of the threshold (absolute value) may be different between the front direction and the back direction, and the magnitude (absolute value) of the threshold may be different between the left direction and the right direction.

When the absolute value of the acceleration detected by the IMU 20 is equal to or more than the predetermined threshold value, the calculation section 32 calculates the acceleration generated in the left work implement operating lever 15 and the right work implement operating lever 16 using the acceleration generated in the vehicle main body 2, and calculates the force to be imparted to the left work implement operating lever 15 and the right work implement operating lever 16.

The imparting signal generation section 33 generates signals s2 and s6 for controlling the imparting section 17 based on the calculated force to be imparted to the left work implement operating lever 15 and the right work implement operating lever 16 and transmits signals S2 and S6 to the respective imparting sections 17. The control section 30, and the first motors 24 and the second motors 25 of the two imparting sections 17 are electrically connected by wire or wirelessly, and signals s2 and s6 including information for controlling the imparting section 17 are transmitted from the control section 30 to the first motor 24 or the second motor 25.

Figure 7:
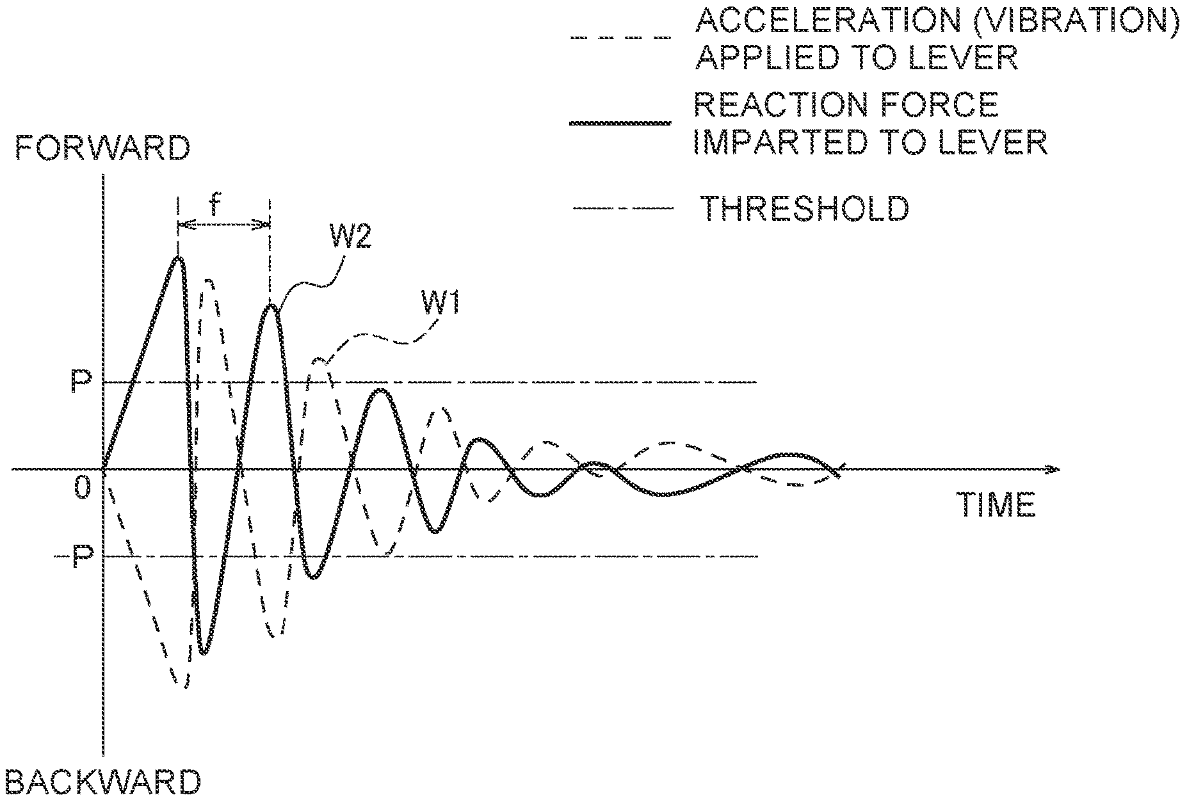
FIG. 7 is a diagram showing an example of acceleration applied to a work implement operating lever and a reaction force imparted to the work implement operating lever.

FIG. 7 is a diagram showing the acceleration applied to the work implement operating lever and the reaction force imparted to the work implement operating lever. The acceleration applied to the work implement operating lever is indicated by the dotted waveform W1, and the reaction force imparted to the work implement operating lever is indicated by the solid waveform W2.

As an example, the graph of FIG. 7 shows the acceleration applied to the work implement operating lever in the front-back direction, the acceleration in the front direction is positive, and the acceleration in the back direction is negative. As shown in the waveform W1, when acceleration is applied in the front-back direction at a constant period, the tilt of the lever in the front-back direction can be restricted by imparting the waveform W2 including the opposite phase of the waveform W1 to the left work implement operating lever 15 and the right work implement operating lever 16. When the threshold value of acceleration is P, the force of the waveform W2 is imparted to the operating lever while the absolute value of the waveform W1 is more than the threshold value P.

Figure 8:
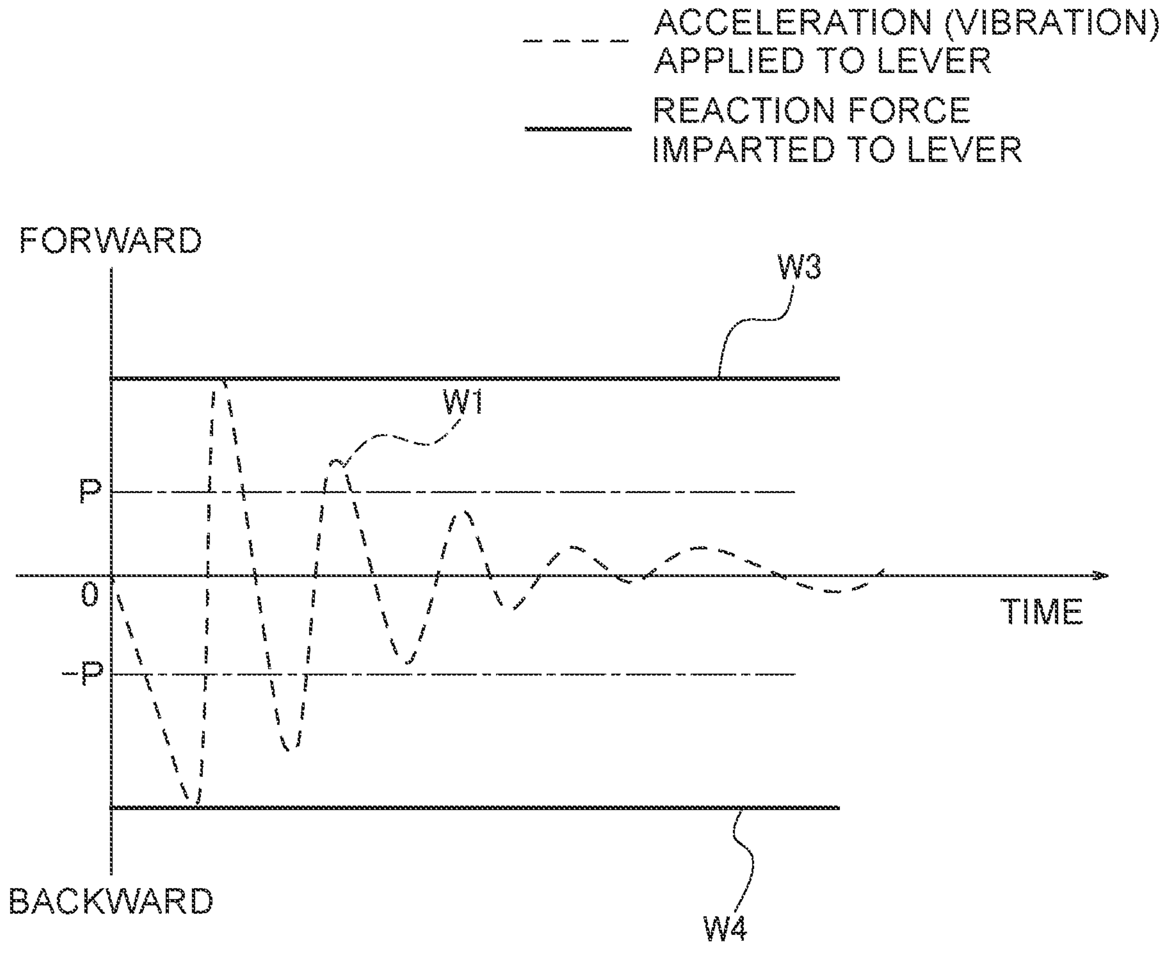
FIG. 8 is a diagram showing another example of acceleration applied to the work implement operating lever and the reaction force imparted to the work implement operating lever.

Further, the force may not be limited to the opposite phase force, and for example, the force imparted by the imparting section 17 may be constant (see W3 and W4) as shown in FIG. 8. When the threshold value of acceleration is P, reaction force is imparted to the operating lever while the absolute value of the waveform W1 is more than the threshold value P. Therefore, the reaction force of W4 is imparted to the left work implement operating lever 15 and the right work implement operating lever 16 when the waveform W1 is equal to or more than the threshold value P. Further, the reaction force of W3 is imparted to the left work implement operating lever 15 and the right work implement operating lever 16 when the waveform W1 is equal to or less than the threshold value −P. The magnitude of the absolute value of W3 may match the maximum value of the absolute value of the backward acceleration in the waveform W1, and the magnitude of the absolute value of W4 may match the maximum value of the absolute value of the forward acceleration in the waveform W1. The maximum value of the absolute value of acceleration may be calculated in advance by an experiment or a simulation.

In the state where reaction force is imparted to the left work implement operating lever 15 and the right work implement operating lever 16 according to their positions in order to give the operator an operation feeling of the lever in a normal operation in which the magnitude (absolute value) of the acceleration detected by the IMU 20 is less than the predetermined threshold value, the reaction force in the normal operation based on the tilted positions of the left work implement operating lever 15 and the right work implement operating lever 16 is adjusted to be W2, W3, or W4 when the magnitude of the acceleration applied to the vehicle main body 2 becomes equal to or more than the predetermined threshold value.

Further, the control section 30, and the first potentiometers 18 and the second potentiometers 19 provided for each of the left work implement operating lever 15 and the right work implement operating lever 16 are electrically connected wirelessly or by wire. The control section 30 receives the signal s3 including the position information of the left work implement operating lever 15 from the first potentiometer 18 or the second potentiometer 19. Further, the control section 30 receives the signal s4 including the position information of the right work implement operating lever 16 from the first potentiometer 18 or the second potentiometer 19.

The control section 30 transmits the command signal s5 based on the signal s3 received from the first potentiometer 18 and the second potentiometer 19 of the left work implement operating lever 15 and the signal s4 received from the first potentiometer 18 and the second potentiometer 19 of the right work implement operating lever 16, and drives the hydraulic cylinders 10 to 12 to operate the work implement 3 and revolve the revolving unit 5.

(Operation)

The operation of the hydraulic excavator 1 according to the embodiment of the present disclosure will be described below.

Figure 9:
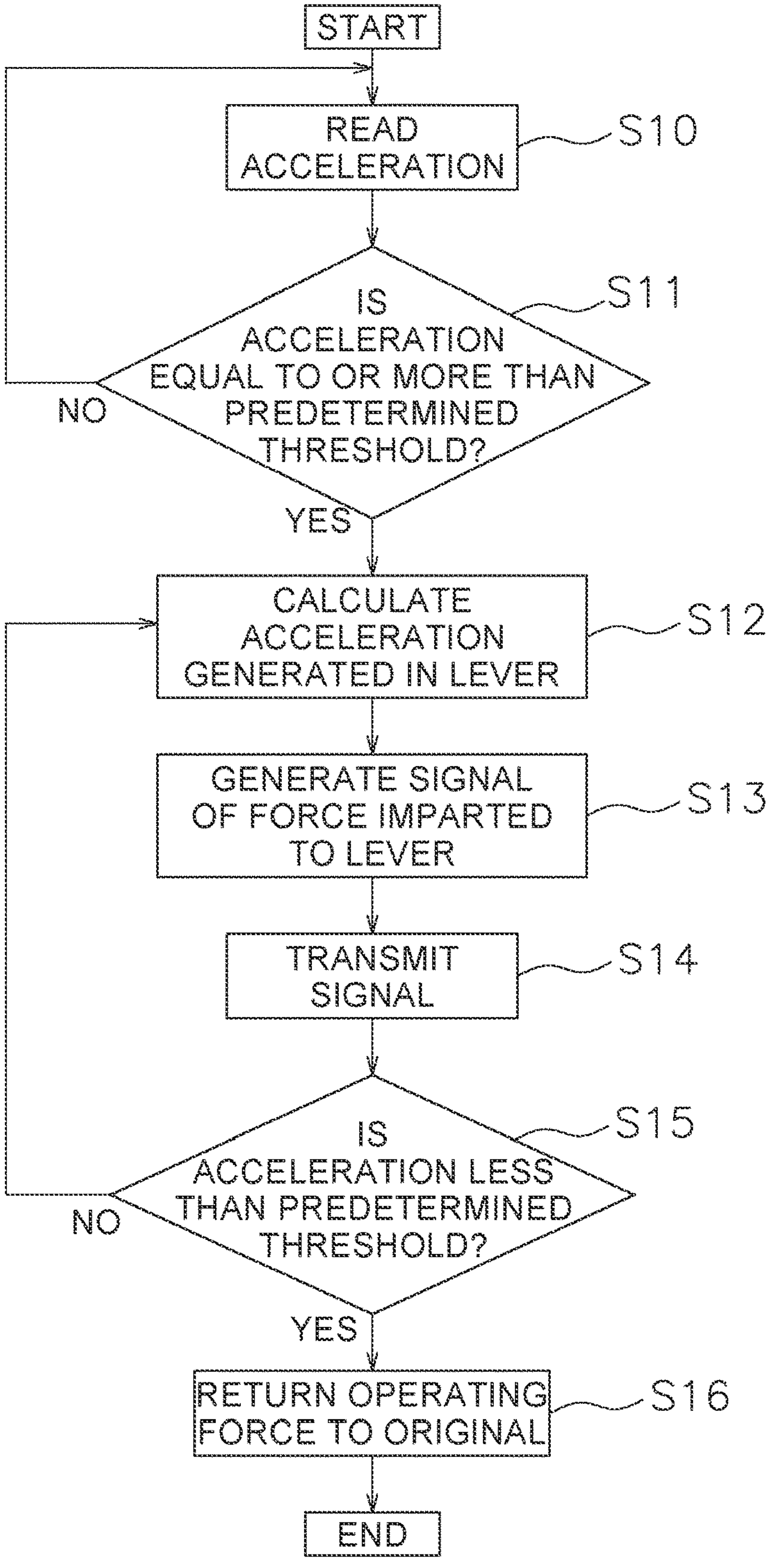
FIG. 9 is a flow chart showing a method for controlling the hydraulic excavator on FIG. 1.

FIG. 9 is a flow chart showing a method for controlling the hydraulic excavator 1.

First, in step S10, the control section 30 receives the signal s1 including the acceleration information detected by the IMU 20, and reads the acceleration value.

Next, in step S11, the determination section 31 determines whether or not the absolute value of the acceleration is equal to or more than the predetermined threshold value.

When the absolute value of the acceleration is less than the predetermined threshold value in step S11, the control returns to step S10 and the acceleration value is read.

On the other hand, in step S11, when the absolute value of acceleration is equal to or more than the predetermined threshold value, the calculation section 32 calculates the acceleration generated in the left work implement operating lever 15 and the right work implement operating lever 16 by the acceleration generated in the vehicle main body 2 in step S12. Then, the calculation section 32 calculates the force to be imparted to the left work implement operating lever 15 and the right work implement operating lever 16 from the calculated acceleration.

Next, in step S13, the imparting signal generation section 33 creates the signal s2 for controlling the first motor 24 or the second motor 25 based on the calculation result. At this time, depending on the positions of the left work implement operating lever 15 and the right work implement operating lever 16, reaction force may be imparted in the normal operation. In that case, the reaction force in the normal operation is adjusted to be W2, W3 or W4.

Next, in step S14, the control section 30 transmits signals s2 and s6 to the first motor 24 and the second motor 25 of the left work implement operating lever 15 and the first motor 24 and the second motor 25 of the right work implement operating lever 16. Base on the signals s2 and s6, the imparting section 17 imparts the force to the left work implement operating lever 15 and the right work implement operating lever 16 by the first motor 24 or the second motor 25.

Next, in step S15, the determination section 31 determines whether the absolute value of the acceleration detected by the IMU 20 is less than the predetermined threshold value.

When the determination section 31 determines in step S15 that the absolute value of the acceleration has not reached less than the predetermined threshold value, the control returns to step S12, and the calculation section 32 calculates the acceleration generated in the left work implement operating lever 15 and the right work implement operating lever 16, and steps S12 to S15 are repeated.

On the other hand, when it is determined in step S15 that the absolute value of the acceleration has reached less than the predetermined threshold value, in step S16, the control section 30 transmits a command signal to each of the imparting section 17 so as to return the operating force of the left work implement operating lever 15 and the right work implement operating lever 16 by the imparting section 17 to the original force.

As a result, the operating force of the left work implement operating lever 15 and the right work implement operating lever 16 is returned to the original force, and the control is completed. Here, "returned to the original force" means that when the reaction force is imparted in the normal operation, the reaction force is returned to the reaction force in the normal operation.

The control in steps S10 to S16 is always performed while the hydraulic excavator 1 is operating.

By the control described above, the reaction force is imparted to the left work implement operating lever 15 and the right work implement operating lever 16 while the waveform W1 is equal to or more than +P and the waveform W1 is equal to or less than −P in FIG. 7.

Embodiment 2

In the first embodiment, when the absolute value of the acceleration detected by the IMU 20 is equal to or more than the predetermined threshold value, a reaction force is imparted to the left work implement operating lever 15 and the right work implement operating lever 16 by the first motor 24 or the second motor 25. However, in the second embodiment, the left work implement operating lever 15 and the right work implement operating lever 16 are fixed.

Figure 10:
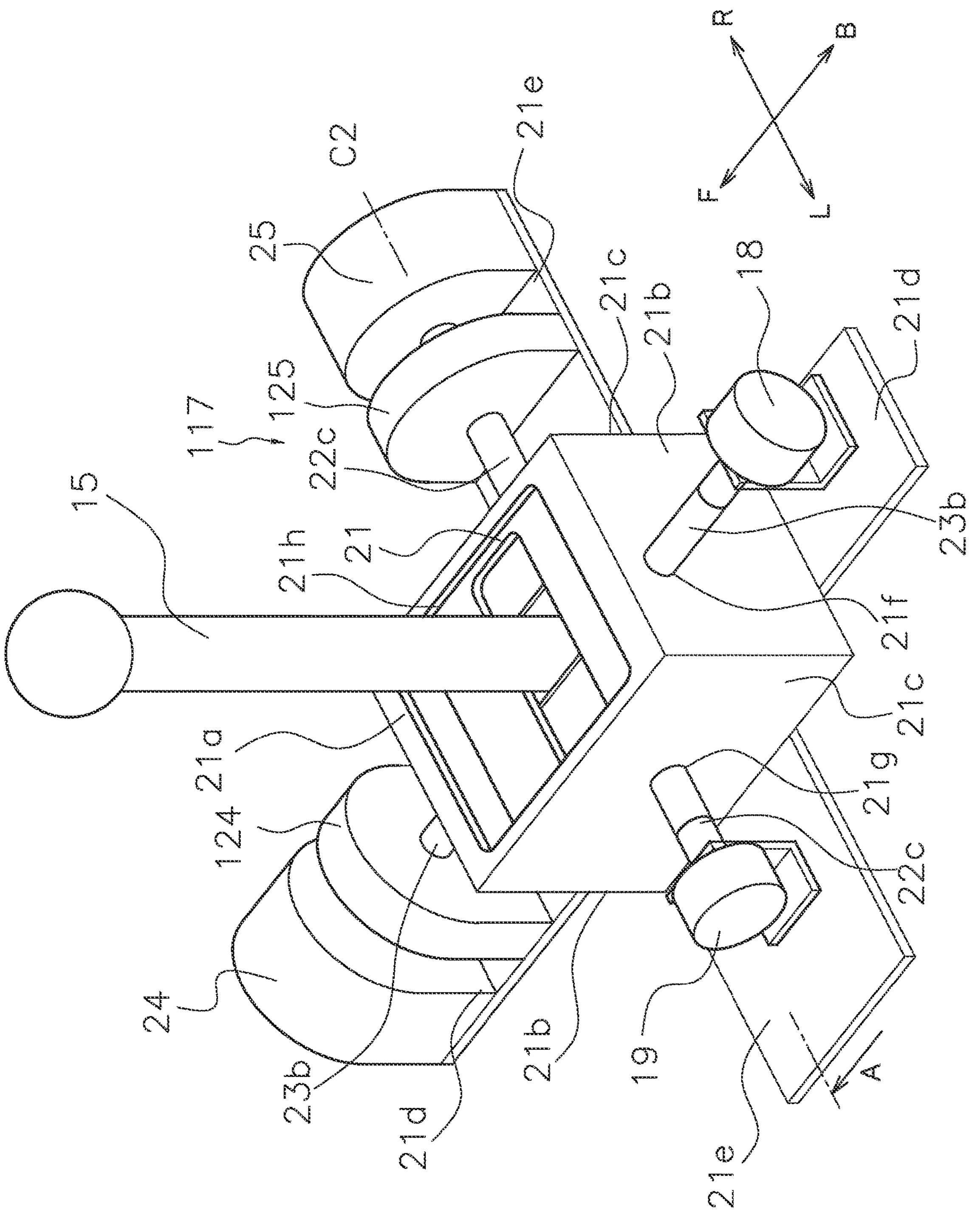
FIG. 10 is a perspective view of an imparting section of the second embodiment according to the present disclosure.

FIG. 10 is a diagram showing a imparting section 117 of the second embodiment. The imparting section 117 of the second embodiment is further provided with the first brake 124 and the second brake 125 as compared with the imparting section 17 of the first embodiment.

The first brake 124 is attached to the shaft 23*b* of the third support frame 23 and is fixed to the arrangement surface 21*d*. The second brake 125 is attached to the shaft 22*c* of the second support frame 22 and is fixed to the arrangement surface 21*e*.

Since the configuration and operation of the first brake 124 and the second brake 125 are the same, the first brake 124 will be described as an example.

Figure 11:
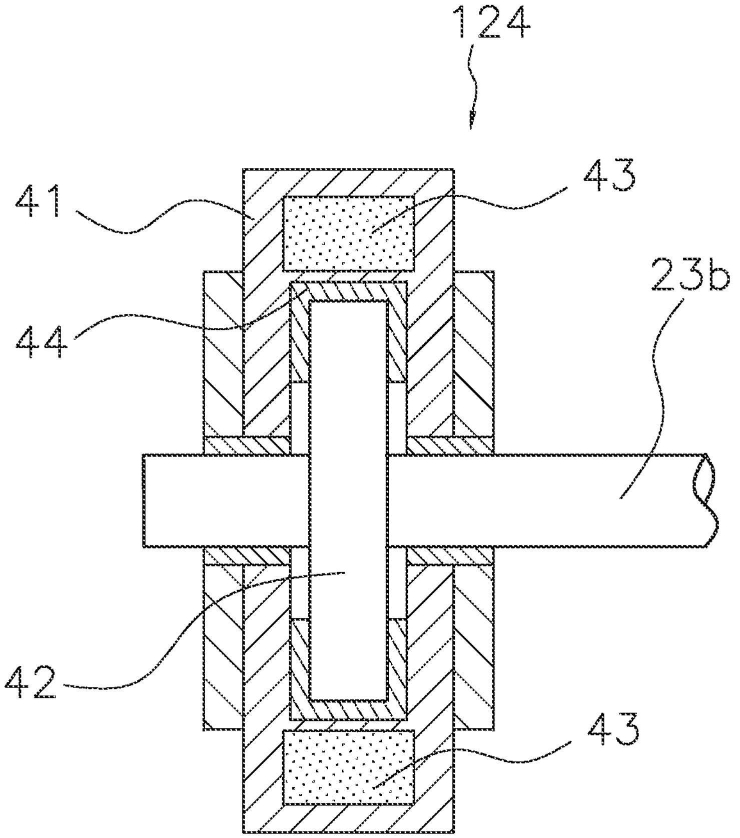
FIG. 11 is a cross-sectional view of the first brake on FIG. 10.

FIG. 11 is a diagram showing a cross-sectional configuration of the first brake 124. The first brake 124 is, for example, an MR (Magneto-Rheological) brake. The first brake 124 includes an outer frame part 41, a rotor 42, a coil 43, and an MR fluid 44.

The outer frame part 41 is fixed to the arrangement surface 21*d*. A space is provided inside the outer frame part 41. The shaft 23*b* of the third support frame 23 is inserted through the outer frame part 41. The rotor 42 is arranged inside the outer frame part 41 and is fixed to the shaft 23*b*. As the shaft 23*b* rotates, the rotor 42 also rotates inside the outer frame part 41. The coil 43 is provided on the outer frame part 41 on the outside of the rotor 42. The MR fluid 44 is filled in the peripheral part of the rotor 42 in a space inside the outer frame part 41.

When the determination section 31 determines that the absolute value of the acceleration detected by the IMU 20 is equal to or more than the predetermined threshold value, the control section 30 transmits an energization command signal to the imparting section 117. When this energization command signal is received, electricity is passed through the coil 43 to generate a magnetic field. Since the MR fluid 44 solidifies due to the generation of the magnetic field, the rotation of the rotor 42 is braked, and the rotation of the shaft 23*b* is also braked. As a result, the movement of the left work implement operating lever 15 is stopped.

(Characteristics)

(1)

The hydraulic excavator 1 (an example of a work vehicle) of the first and second embodiments includes the vehicle main body 2, the work implement 3, the left work implement operating lever 15 (an example of an operating lever), and the right work implement operating lever 16 (an example of an operating lever), a imparting section 17, 117, an IMU 20 (an example of an acceleration detection section), and a control section 30. The work implement 3 is attached to the vehicle main body 2. The imparting section 17 imparts force to the left work implement operating lever 15 and the right work implement operating lever 16. The IMU 20 detects the acceleration of the vehicle main body 2. The control section 30 controls the imparting section 17 to automatically adjust the magnitude of the force imparted to the left work implement operating lever 15 and the right work implement operating lever 16, based on the acceleration detected by the IMU 20.

As a result, it is possible to determine that a malfunction due to vibration or impact may occur based on the acceleration of the vehicle main body 2 and to automatically adjust the force imparted by the imparting section 17 to the left work implement operating lever 15 and the right work implement operating lever 16. Therefore, it is possible to prevent the left work implement operating lever 15 and the right work implement operating lever 16 from being erroneously operated.

(2)

In the hydraulic excavator 1 (an example of a work vehicle) of the first and second embodiments, the control section 30 controls the imparting section 17 to automatically adjust the magnitude of the force imparted to the left work implement operating lever 15 and the right work implement operating lever 16 when the absolute value (magnitude of acceleration) of the acceleration detected by the IMU 20 is equal to or more than the predetermined threshold value.

As a result, when the absolute value of the acceleration of the vehicle main body 2 is equal to or more than the predetermined threshold value, it is possible to determine that a malfunction due to vibration or impact may occur and to automatically adjust the force imparted by the imparting section 17 to the left work implement operating lever 15 and the right work implement operating lever 16.

(3)

In the hydraulic excavator 1 (an example of a work vehicle) of the first embodiment, the imparting section 17 includes the first motors 24 (an example of an actuator) and a second motors 25 (an example of an actuator) connected to the left work implement operating lever 15 and the right work implement operating lever 16. When the absolute value of the acceleration detected by the IMU 20 is equal to or more than the predetermined threshold value, the control section 30 controls the imparting section 17 to impart the reaction force against the force imparted to the left work implement operating lever 15 and the right work implement operating lever 16 by the acceleration of the vehicle main body 2.

As a result, the reaction force can be imparted against the force imparted to the left work implement operating lever 15 and the right work implement operating lever 16 due to the vibration or impact of the vehicle main body 2. Therefore, the movements of the left work implement operating lever 15 and the right work implement operating lever 16 due to impact or vibration can be restricted, and erroneous operation can be suppressed.

(4)

In the hydraulic excavator 1 of the first embodiment, the control section 30 controls the imparting section 17 to impart the force (waveform W2) of the opposite phase for the waveform W1 regarding to the force imparted to the left work implement operating lever 15 and the right work implement operating lever 16.

As a result, it is possible to impart the reaction force to the left work implement operating lever 15 and the right work implement operating lever 16 by the imparting section 17 so as to offset the force imparted to the left work implement operating lever 15 and the right work implement operating lever 16 due to the vibration or impact of the vehicle main body 2. Therefore, it is possible to restrict the movements of the left work implement operating lever 15 and the right work implement operating lever 16 due to impact or vibration, and to suppress erroneous operation.

(5)

In the hydraulic excavator 1 of the present embodiment, when the absolute value of the acceleration detected by the IMU 20 is equal to or more than the predetermined threshold value, the control section 30 controls the imparting section 17 to impart the constant reaction force against the force imparted to the left work implement operating lever 15 and the right work implement operating lever 16 by the acceleration of the vehicle main body 2.

As a result, it is possible to impart the reaction force to the left work implement operating lever 15 and the right work implement operating lever 16 by the imparting section 17 against the force imparted to the left work implement operating lever 15 and the right work implement operating lever 16 by the vibration or impact of the vehicle main body 2. Therefore, it is possible to restrict the movements of the left work implement operating lever 15 and the right work implement operating lever 16 due to impact or vibration, and to suppress erroneous operation.

(6)

In the hydraulic excavator 1 of the first embodiment, the control section 30 calculates the reaction force imparted to the left work implement operating lever 15 and the right work implement operating lever 16 by obtaining the force imparted to the left work implement operating lever 15 and the right work implement operating lever 16 based on the acceleration detected by the IMU 20 (an example of the acceleration detection section).

As a result, it is possible to calculate the acceleration generated in the left work implement operating lever 15 and the right work implement operating lever 16 by the acceleration of the vehicle main body 2 and calculate the reaction force imparted to the left work implement operating lever 15 and the right work implement operating lever 16. Therefore, it is possible to restrict the movements of the left work implement operating lever 15 and the right work implement operating lever 16 due to impact or vibration and to suppress erroneous operation.

(7)

In the hydraulic excavator 1 of the second embodiment, the imparting section 117 gives a braking force to the left work implement operating lever 15 and the right work implement operating lever 16. The control section 30 controls the imparting section 117 to fix the left work implement operating lever 15 and the right work implement operating lever 16 when the absolute value of the acceleration detected by the IMU 20 is equal to or more than the predetermined threshold value.

As a result, it is possible to restrict the movements of the left work implement operating lever 15 and the right work implement operating lever 16 due to impact or vibration and to suppress erroneous operation.

(8)

The method for controlling the hydraulic excavator 1 of the first and second embodiments includes step S10 (an example of a reception step), steps S12 to S13 (an example of an adjustment step), and step S14 (an example of a transmission step).

Step S10 receives the acceleration of the vehicle main body 2. Step S12 automatically adjusts the magnitude of the force imparted to the left work implement operating lever 15 and the right work implement operating lever 16 for operating the work implement 3 provided on the vehicle main body 2 based on the received acceleration. Step S14 transmits signal s2 (an example of a command) to the imparting section 17 that imparts force to the left work implement operating lever 15 and the right work implement operating lever 16 so that the force of the adjusted magnitude is imparted to the left work implement operating lever 15 and the right work implement operating lever 16.

As a result, it is possible to determine that a malfunction due to vibration or impact may occur based on the acceleration of the vehicle main body 2 and to automatically adjust the force imparted by the imparting section 17 to the left work implement operating lever 15 and the right work implement operating lever 16. Therefore, it is possible to prevent the left work implement operating lever 15 and the right work implement operating lever 16 from being erroneously operated.

(9)

The method for controlling the hydraulic excavator 1 of the first and second embodiments further includes step S11 (an example of a determination step). In step S11, it is determined whether or not the absolute value of the received acceleration is equal to or more than the predetermined threshold value. In step S12, when the absolute value of the received acceleration is equal to or more than the predetermined threshold value, the magnitude of the force imparted to the left work implement operating lever 15 and the right work implement operating lever 16 for operating the work implement 3 provided on the vehicle main body 2 is automatically adjusted.

As a result, when the absolute value of the acceleration of the vehicle main body 2 is equal to or more than the predetermined threshold value, it is possible to determine that a malfunction due to vibration or impact may occur and to automatically adjust the force imparted by the imparting section 17 to the left work implement operating lever 15 and the right work implement operating lever 16.

Other Embodiments

Although one embodiment of the present invention has been described above, the present invention is not limited to the above embodiment, and various modifications can be made without departing from the gist of the invention.

(A)

In the above embodiment, the acceleration applied to the left work implement operating lever 15 and the right work implement operating lever 16 is calculated from the acceleration detected by the IMU 20, and the force imparted by the imparting section 17 is determined. The force imparted by the imparting section 17 may be determined based on the positions of the left work implement operating lever 15 and the right work implement operating lever 16. The positions of the left work implement operating lever 15 and the right work implement operating lever 16 are detected by the first potentiometer 18 and the second potentiometer 19 provided respectively.

When the absolute value of the acceleration detected by the IMU 20 is determined to be equal to or more than the predetermined threshold value, for example, the first potentiometer 18 detects that the left work implement operating lever 15 is moving to the right from the position at the time of determination and the control section 30 imparts force so that the left work implement operating lever 15 moves to the left by the first motor 24 of the imparting section 17. Further, when the first potentiometer 18 detects that the left work implement operating lever 15 is moving to the left from the position at the time of determination, the control section 30 imparts force so that the left work implement operating lever 15 moves to the right by the first motor 24 of the imparting section 17.

In this way, the hydraulic excavator 1 includes the first potentiometer 18 (an example of a position detection section) and the second potentiometer 19 (an example of a position detection section) detecting the positions of the left work implement operating lever 15 and the right work implement operating lever 16. The control section 30 controls the imparting section 17 to impart the reaction force against the force imparted to the left work implement operating lever 15 and the right work implement operating lever 16 based on the positions of the left work implement operating lever 15 and the right work implement operating lever 16 detected by the first potentiometer 18 and the second potentiometer 19 when the magnitude of the acceleration detected by the IMU 20 (an example of the acceleration detection section) is equal to or more than the predetermined threshold value.

As a result, reaction force can be imparted by the imparting section 17 so as to suppress the change in the positions of the left work implement operating lever 15 and the right work implement operating lever 16 due to the vibration or impact of the vehicle main body 2. Therefore, it is possible to suppress erroneous operation of the left work implement operating lever 15 and the right work implement operating lever 16 due to the vibration or impact.

(B)

In the above embodiment, in step S15, the determination section 31 only determines whether the absolute value of the acceleration detected by the IMU 20 is less than the predetermined threshold value, but may determines whether the absolute value of the acceleration is less than the predetermined threshold value for a predetermined time.

The reaction force is imparted when the absolute value of the acceleration detected by the IMU 20 is equal to or more than the predetermined threshold value, but in that case, the reaction force is imparted only in the interrupted region where the absolute value of the acceleration is equal to or more than the predetermined threshold value P. Therefore, the reaction force can be continuously imparted to the left work implement operating lever 15 and the right work implement operating lever 16 by determining whether the absolute value of the acceleration is less than the predetermined threshold value for a predetermined time. The predetermined time may be set to be longer than the period f of the waveform W1 (see FIG. 7). The period f of the waveform W1 may be determined by previously measuring the acceleration applied to the lever due to the vibration or impact of a plurality of patterns.

(C)

In the first and second embodiments, the IMU 20 is provided on the hydraulic excavator 1, but this is not limited to the IMU, and a sensor capable of detecting the acceleration applied to the vehicle main body 2 may be provided.

(D)

When the magnitude of the acceleration applied to the vehicle main body 2 is equal to or more than the predetermined threshold value, erroneous operation is prevented by imparting the reaction force to the left work implement operating lever 15 and the right work implement operating lever 16 in the first embodiment and by fixing the left work implement operating lever 15 and the right work implement operating lever 16 in the second embodiment, but the operation is not limited to this. For example, when the magnitude of the acceleration applied to the vehicle main body 2 is equal to or more than the predetermined threshold value, the left work implement operating lever 15 and the right work implement operating lever 16 may be provided with a dead zone. This makes it possible to prevent erroneous operation.

(E)

The imparting section 117 in the second embodiment includes the first motor 24 and the second motor 25, but when no reaction force is imparted in the normal operation, the first motor 24 and the second motor 25 may not be provided.

The work vehicle and the method for controlling the work vehicle of the present invention exerts an effect of suppressing erroneous operation due to vibration, impact, etc., and is useful as, for example, a hydraulic excavator.

The invention claimed is:

1. A work vehicle comprising:

a vehicle main body;

a work implement attached to the vehicle main body;

an operating lever configured to operate the work implement;

an imparting section configured to impart force to the operating lever;

an acceleration detection section configured to detect acceleration of the vehicle main body; and a control section configured to control the imparting section to automatically adjust a magnitude of the force imparted to the operating lever, based on the acceleration detected by the acceleration detection section.

2. The work vehicle according to claim 1, wherein the control section is configured to control the imparting section to automatically adjust the magnitude of the force imparted to the operating lever when the magnitude of the acceleration detected by the acceleration detection section is at least a predetermined threshold value.

3. The work vehicle according to claim 1, wherein the imparting section includes an actuator connected to the operating lever, and the control section is configured to control the imparting section to impart a reaction force against force imparted to the operating lever by the acceleration of the vehicle main body when the magnitude of the acceleration detected by the acceleration detection section is at least a predetermined threshold value.

4. The work vehicle according to claim 3, wherein the control section is configured to control the imparting section to impart the force of an opposite phase for a waveform of the force imparted to the operating lever.

5. The work vehicle according to claim 1, wherein the control section is configured to control the imparting section to impart a constant reaction force against force imparted to the operating lever by the acceleration of the vehicle main body when magnitude of the acceleration detected by the acceleration detection section is at least a predetermined threshold value.

6. The work vehicle according to claim 4, wherein the control section is configured to calculate the reaction force imparted to the operating lever by obtaining the force imparted to the operating lever based on the acceleration detected by the acceleration detection section.

7. The work vehicle according to claim 1, wherein the imparting section is configured to impart a braking force to the operating lever, and the control section is configured to control the imparting section to fix the operating lever when a magnitude of the acceleration detected by the acceleration detection section is at least a predetermined threshold value.

8. The work vehicle according to claim 1, further comprising:

a position detection section configured to detect a position of the operating lever, the control section being configured to control the imparting section to impart a reaction force against force imparted to the operating lever based on the position of the operating lever detected by the position detection section when a magnitude of the acceleration detected by the acceleration detection section is at least a predetermined threshold value.

9. A method for controlling a work vehicle comprising:

receiving acceleration of a vehicle main body;

automatically adjusting a magnitude of force imparted to an operating lever to operate a work implement attached to the vehicle main body based on received acceleration; and transmitting a command to an imparting section configured to impart force to the operating lever so as to impart an adjusted magnitude of force to the operating lever.

10. The method for controlling the work vehicle according to claim 9, further comprising:

determining whether or not a magnitude of the received acceleration is at least a predetermined threshold value, the automatically adjusting the magnitude of the force imparted to the operating lever to operate the work implement attached to the vehicle main body occurring when the magnitude of the acceleration is at least the predetermined threshold value.

* * * * *